(12) United States Patent
Jing et al.

(10) Patent No.: US 10,222,811 B2
(45) Date of Patent: Mar. 5, 2019

(54) LEVER ASSEMBLY WITH A DAMPER FOR A FLUID REGULATOR

(71) Applicant: Fisher Regulators (Shanghai) Co., Ltd., Shanghai (CN)

(72) Inventors: Chen Jing, Shanghai (CN); Ji Feifei, Shanghai (CN); Song Xiaozhang, Shanghai (CN)

(73) Assignee: Fisher Regulators (Shanghai) Co., Ltd., Shanghai (CN)

( * ) Notice: Subject to any disclaimer, the term of this patent is extended or adjusted under 35 U.S.C. 154(b) by 250 days.

(21) Appl. No.: 15/069,138

(22) Filed: Mar. 14, 2016

(65) Prior Publication Data

US 2017/0068260 A1 Mar. 9, 2017

(30) Foreign Application Priority Data

Sep. 6, 2015 (CN) .......................... 2015 1 0560498

(51) Int. Cl.
| | | |
|---|---|---|
| G05D 16/02 | (2006.01) | |
| F16K 31/528 | (2006.01) | |
| F16K 17/04 | (2006.01) | |
| F16K 17/32 | (2006.01) | |
| F16K 17/34 | (2006.01) | |
| G05D 16/06 | (2006.01) | |

(52) U.S. Cl.
CPC .......... *G05D 16/02* (2013.01); *F16K 17/048* (2013.01); *F16K 17/32* (2013.01); *F16K 17/34* (2013.01); *F16K 31/5288* (2013.01); *G05D 16/0683* (2013.01); *Y10T 137/7831* (2015.04)

(58) Field of Classification Search
CPC .......... Y10T 137/7831; Y10T 137/782; Y10T 137/7815; Y10T 137/783; G05D 16/02; G05D 16/0683; F16K 17/048; F16K 17/32; F16K 17/34; F16K 31/5288
See application file for complete search history.

(56) References Cited

U.S. PATENT DOCUMENTS

| | | | | | |
|---|---|---|---|---|---|
| 1,950,120 | A * | 3/1934 | McKee | .............. | G05D 16/0686 137/247 |
| 3,386,465 | A * | 6/1968 | Johnson | ............. | G05D 16/0694 137/463 |
| 4,069,839 | A * | 1/1978 | Hughes | .............. | G05D 16/0686 137/505.46 |
| 5,062,449 | A * | 11/1991 | Woollums | .............. | G05D 16/02 137/116.5 |
| 5,402,820 | A * | 4/1995 | Duffy | ................. | G05D 16/0683 137/505 |
| 5,735,306 | A * | 4/1998 | Olds | ................. | G05D 16/0686 137/116.5 |
| 6,431,205 | B1 * | 8/2002 | Bartos | ................ | G05D 16/0686 137/505.46 |

(Continued)

*Primary Examiner* — Jessica Cahill
(74) *Attorney, Agent, or Firm* — Marshall, Gerstein & Borun LLP (57) ABSTRACT

A lever assembly for a flow regulator includes a damper to reduce unwanted movement of the lever in an opening and closing direction. The damper includes one or more resilient spring members that squeeze the lever with an amount of force sufficient to reduce unwanted pivoting of the lever without preventing the lever from pivoting in response to control movements of an actuator adapted to actuate the lever.

19 Claims, 5 Drawing Sheets

(56) References Cited

U.S. PATENT DOCUMENTS

| | | | |
|---|---|---|---|
| 7,261,119 B2 * | 8/2007 | Olds | G05D 16/0686 137/14 |
| 9,709,998 B2 * | 7/2017 | Blanchard | G05D 16/0683 |
| 2006/0065307 A1 * | 3/2006 | Schmidt | G05D 16/02 137/505.46 |
| 2013/0146157 A1 * | 6/2013 | Hsiao | G05D 16/0691 137/505.39 |
| 2014/0261787 A1 * | 9/2014 | Blanchard | G05D 16/0683 137/505 |

* cited by examiner

LEVER ASSEMBLY WITH A DAMPER FOR A FLUID REGULATOR

FIELD

This application relates generally to a fluid regulator, and more specifically to a lever assembly for a fluid regulator, the lever assembly having a damper that reduces undesirable oscillation of a lever to be operatively coupled to a flow control member of the fluid regulator.

BACKGROUND

For typical gas distribution systems, the fluid pressure may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a piece of equipment. Fluid regulators are used to regulate the output pressure of a fluid, such as a liquid or a gas, to meet a desired pressure in a supply line. Therefore, fluid regulators are installed in these distribution systems in order to ensure that the delivered fluid meets the pressure and/or capacity requirements of the end-user facilities.

Figure 1:
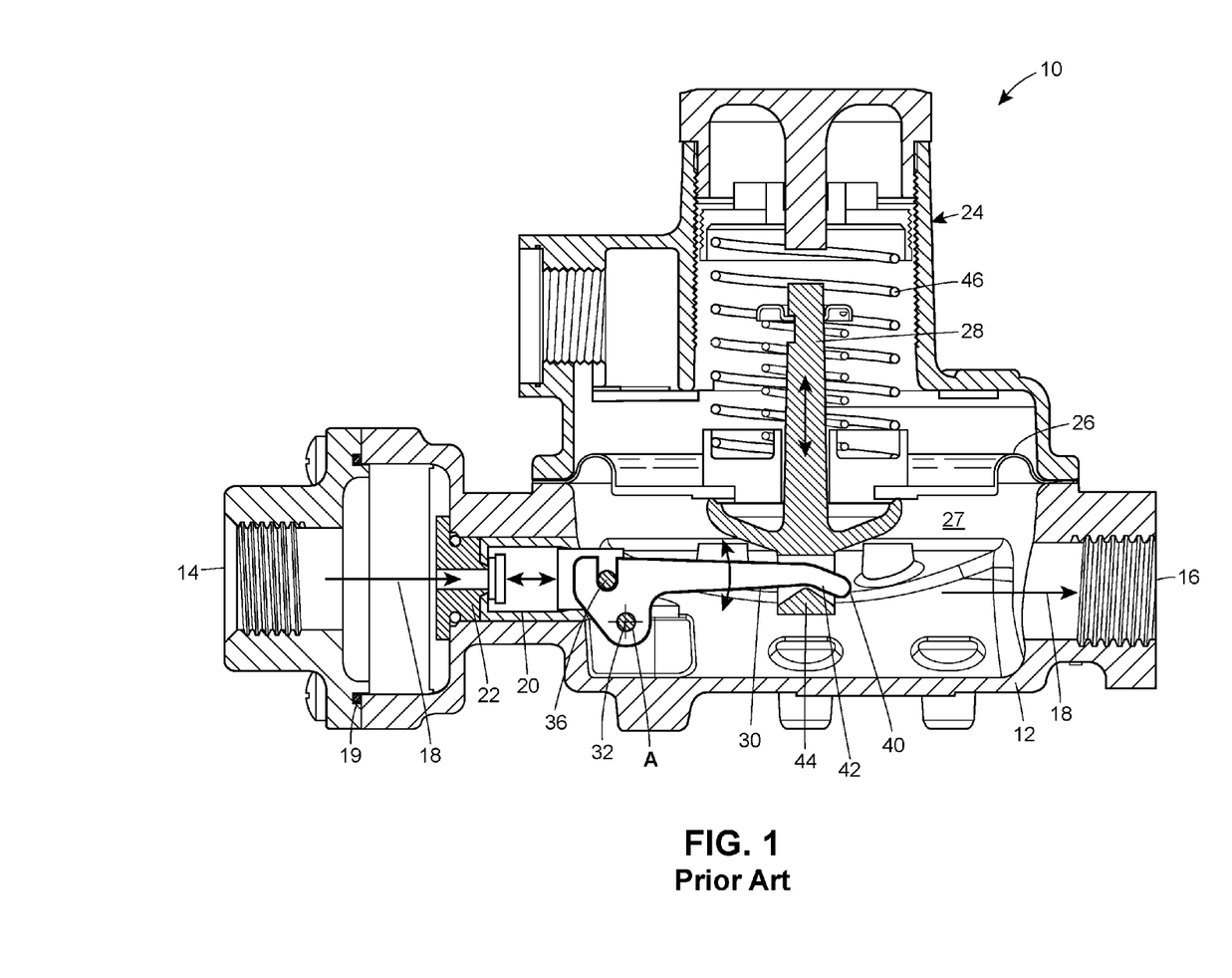
FIG. 1 is a cross-sectional view of a known fluid regulator in a closed position.
Figure 2:
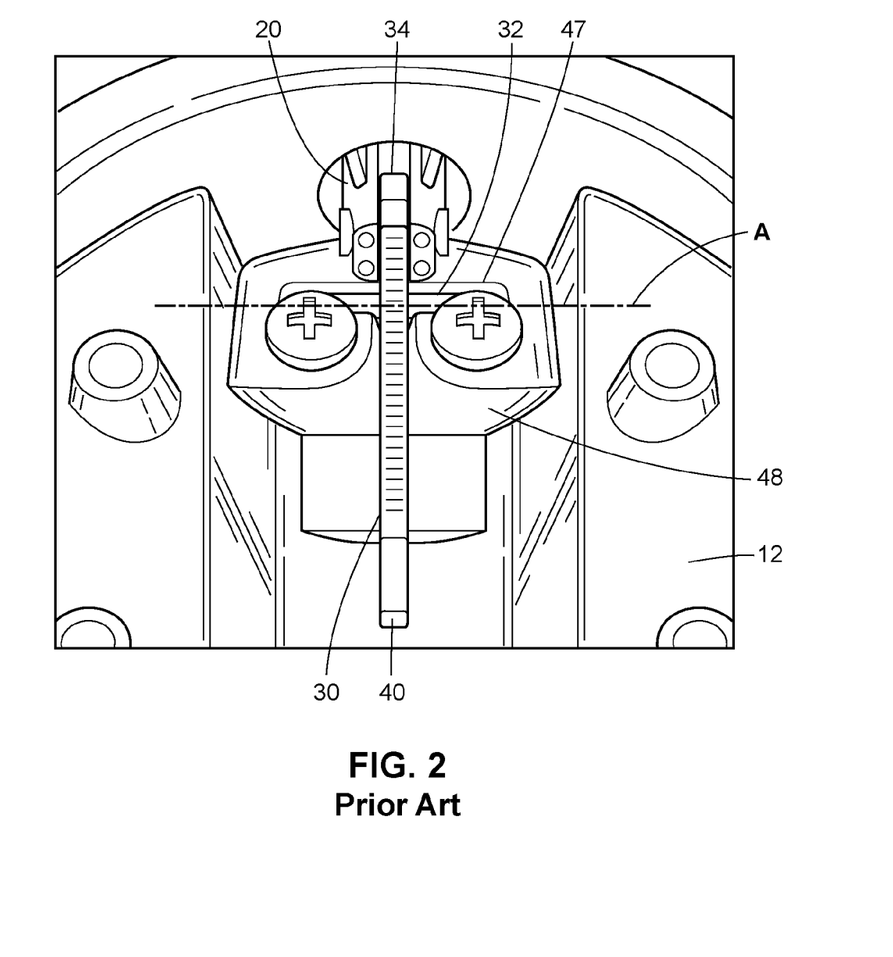
FIG. 2 is a top perspective view of a lever assembly of the fluid regulator of FIG. 1.

FIGS. 1 and 2 illustrate one example known fluid regulator 10. The fluid regulator 10 includes a regulator body 12 having an inlet 14 coupled to an outlet 16 by a fluid passageway 18, a flow control member 20 disposed in the regulator body 12 and arranged to shift toward and away from a valve seat 22 so as to control the flow of fluid through the fluid passageway 18. An O-ring 19 is assembled on the inlet fitting. An actuator 24 is coupled to the regulator body 12, and includes a pressure sensing element, such as a diaphragm 26, that forms a wall of a pressure chamber 27, which is in fluid communication with the outlet 16 so as to sense fluid pressure at the outlet 16. An actuator stem 28 is coupled to the diaphragm 26 and arranged to move up and/or down with the diaphragm 26 in response to changes in fluid pressure at the outlet 16. A lever 30 is operatively coupled to each of the flow control member 20 and the actuator 24 to convert the movement of the diaphragm 26 into a corresponding movement of the flow control member 20 to maintain the outlet pressure at a preselected level. In particular, the lever 30 operatively couples the actuator stem 28 with the flow control member 20 and pivots to transfer the vertical movement of the actuator stem 28 into the horizontal movement of the flow control member 20. The lever 30 has an arm extending between a first end, e.g., a front end 34, and a second end, e.g., a back end 40, and the lever 30 is pivotably coupled to the regulator body 12 by a pin 32. The front end 34 is coupled to the flow control member 20 by a second pin 36 that is slidably disposed within a notch 38 at the front end 34 of the lever 30. The back end 40 of the lever 30 is coupled to the actuator stem 28 by a hooked portion 42 that is downwardly angled at the second end 40 of the lever 30 and hooked over a saddle 44 at a lower end of the actuator stem 28. A spring 46 presses against a top side of the diaphragm 26 opposite from the pressure chamber 27.

As best seen in FIG. 2, the lever 30 generally has the form of a flat plate having two opposite parallel sides. An outer periphery of the lever 30 is defined by top and bottom edges, and the pin 32 extends transversely through the two sides of the lever 30. The pin 32 is pivotably carried within a slot 47 of a lever receiver 48 that is coupled to the regular body 12. The lever receiver 48 allows the lever 30 and/or the pin 32 to rotate about an axis A of the pin 32 within the plane of the lever 30 perpendicular to the axis A.

Again referring to FIG. 1, in operation, as fluid flows through the regulator body 12 from the inlet 14, past the valve seat 22 (which is shown here in a closed position), and toward the outlet 16, the fluid pressure near the outlet 16 also presses upwardly against the diaphragm 26. The fluid pressure near the outlet 16 and the force the spring 46 together move the diaphragm 26 up and/or down in response to fluctuating fluid pressures at the outlet 16. The movement of the diaphragm 26 correspondingly moves the actuator stem 28 and the second end 40 of the lever 30 up and/or down. As the second end 40 of the lever 30 moves up or down, the lever 30 pivots about the pin 32, which causes the first end 34 to move horizontally back and forth, and thereby converts the vertical movement of the actuator stem 28 into the horizontal movement of the flow control member 20.

The positioning of the lever 30 is typically carefully calibrated so that movements of the diaphragm 26 cause the flow control member 20 to move toward or away from the valve seat 22 a predetermined distance. In a highly pressurized environment, however, rapid changes in the fluid pressure at the inlet 14 may cause the flow control member 20 and the lever 30 to oscillate rapidly, which may lead to an undesirable oscillation typically called "valve flutter." Such valve flutter can lead to undesirable effects, such as excessive wear of the flow control member 20 and/or the various connections between the flow control member 20, the lever 30, and the actuator stem 28, all of which may lead to a loss of accuracy and/or responsiveness of the fluid regulator 10. Accordingly, it would be desirable to provide a fluid regulator that can reduce or eliminate valve flutter.

SUMMARY

According to some aspects of the disclosure, a lever assembly for a fluid regulator includes a damper that squeezes the lever with an amount of force sufficient to reduce unwanted pivoting of the lever without preventing the lever from pivoting in response to control movements of an actuator adapted to actuate the lever.

According to some aspects of the disclosure, a lever for a lever assembly of a fluid regulator includes a lobe projecting from a lever arm to engage a damper.

According to some aspects of the disclosure, a fluid regulator includes a lever pivotably coupled to a regulator body to shift a closure member between an open position and a closed position, an actuator coupled to the lever to rotate the lever in response to fluid pressure in the regulator body, and a damper that squeezes the lever with an amount of force sufficient to reduce unwanted pivoting of the lever without preventing the lever from pivoting in response to control movements of the actuator.

Additional aspects, arrangements, features, and/or technical effects will become apparent upon detailed inspection of the figures and the detailed description.

DETAILED DESCRIPTION

Before describing the specific examples shown in the drawings, some general aspects, arrangements, and features of the disclosed lever, damper, lever assembly, and/or fluid regulator are provided.

In some arrangements of the disclosure, a lever assembly for a fluid regulator includes a lever to be pivotably coupled to a regulator body and a damper to be coupled to the regulator body. The lever may rotate about a first axis to shift a flow control member between an open position and a closed position in the valve body, for example along a second axis. The damper is to squeeze the lever, preferably with an amount of force sufficient to reduce unwanted pivoting of the lever without preventing the lever from pivoting in response to control movements of an actuator adapted to actuate the lever.

In some arrangements of the disclosure, a fluid regulator includes a regulator body, a flow control member, a lever, an actuator, and a damper. The regulator body defines a flow path extending from an inlet to an outlet. The flow control member may be disposed in the regulator body and may be shiftable between an open position and a closed position to control the flow of fluid through the flow path. The lever may be pivotably coupled to the regulator body so as to rotate about a first axis to shift the closure member between the open position and the closed position, for example, along a second axis. The actuator may be coupled to the lever so as to rotate the lever about the first axis in response to fluid pressure in the regulator body. The damper may be coupled to the regulator body and arranged to squeeze the lever, preferably parallel to the first axis, with an amount of force sufficient to reduce unwanted pivoting of the lever without preventing the lever from pivoting in response to control movements of the actuator.

In some arrangements of the disclosure, the lever for a fluid regulator includes a lever arm, a first coupling, a second coupling, a pivot, and a lobe. The lever arm may have a first side and a second side extending between a top edge, a bottom edge, a first end, and a second end. The first coupling may be disposed at the first end of the lever arm to be operatively coupled to a flow control member of the fluid regulator. The second coupling may be disposed at the second end of the lever arm to be operatively coupled to an actuator for the fluid regulator. The pivot may be disposed along the lever arm to be pivotably coupled with a regulator body. The lobe may project downwardly from the bottom edge of the lever arm to engage a damper, such as a clip spring. The lobe is arranged to engage a damper, such as by being movably clamped between resilient spring members of the damper. Preferably, the pivot extends along the first axis.

Any one of the aspects and/or arrangements disclosed herein may further include any one or more of the following features.

The damper may have first and second spring members to frictionally engage the lever and/or the lobe. The damper may be in the form of or include a clip spring. The clip spring may include a base, a first spring member extending upwardly from the base, and a second spring member extending upwardly from the base. The first and second spring members may be spaced apart a distance so as to form a gap sufficient to receive at least a portion of the lever to be disposed between the first spring member and the second spring member. Further, the first and second spring members may arranged so as to squeeze against opposite sides of the portion of the lever, preferably with a preselected compression force, so as to clip to the lever. The first and second spring members may be in the form of opposing first and second prongs that are coupled by a base and that clip to the lever. One or both of the first and second prongs may have a distal end that is shaped so as to form a tapered receiver for the lever arm. The first and second prongs may slant together from the base toward a clamping region where the first and second prongs clamp against opposite sides of the lever arm and/or lobe. A distal end of one or both of the first and second prongs may flare outwardly, such as with a curve and/or at an angle, away from the clamping region. Proximal ends of one or both of the first and second prongs may be coupled to opposite spaced apart edges of the base.

The pivot may include an aperture extending through the lever along the first (pivot) axis to receive a pin about which the lever can pivot. The pivot may include an offset portion projecting downwardly from the bottom edge of the lever arm to offset the lever arm from the pivot axis. The offset portion may be disposed at the front end of the lever. The aperture may extend through the offset portion, for example, to provide a desired mechanical lever advantage. The pivot may include a pin extending along the first axis. The pin may be formed separately from the lever and disposed through the aperture. Alternatively, the pin may be formed integrally with the lever without forming the aperture. The pin may be fixed attached to the lever, for example, with a tight friction fit, welding, or single-piece construction, in order to prevent independent movement of the lever relative to the pin under selected operation conditions.

The lobe may be disposed between the pivot and the second end of the lever arm, which may provide a desired mechanical advantage and/or affect the amount of frictional pressure required from the damper to sufficiently dampen unwanted oscillations. The lobe may project downwardly from the bottom edge of the lever arm toward the clip spring. The lobe may have parallel opposite sides to be engaged by the spring members to provide a constant damping force, for example, through the entire range of motion of the lever. The lobe may be coplanar with the lever and the pivot. That is, the lever arm, the pivot, and the lobe may be disposed in a single plane, which may be transverse to the first axis. The first and second sides of the lever arm may be parallel with each other, and the lever may have a single thickness between the first and second sides. The lobe may be spaced apart from the pivot and/or the second end of the lever arm. The offset portion of the pivot and the lobe may be disposed on the same edge of the lever arm, such as along the bottom edge, or on different edges of the lever arm.

The first coupling may have the form of an elongate cutout to receive a bit connected to the closure member. The cutout is preferably sized to allow the bit to slide along the elongate cutout, for example, as the lever rotates about the pivot. The second coupling may have the form of an angled portion of the lever arm at the back end to hook to an actuator stem, for example, to be disposed over a saddle portion of the actuator stem. However, the first and second couplings may take other forms suitable for coupling with the flow control member and the actuator stem, respectively.

Figure 3:
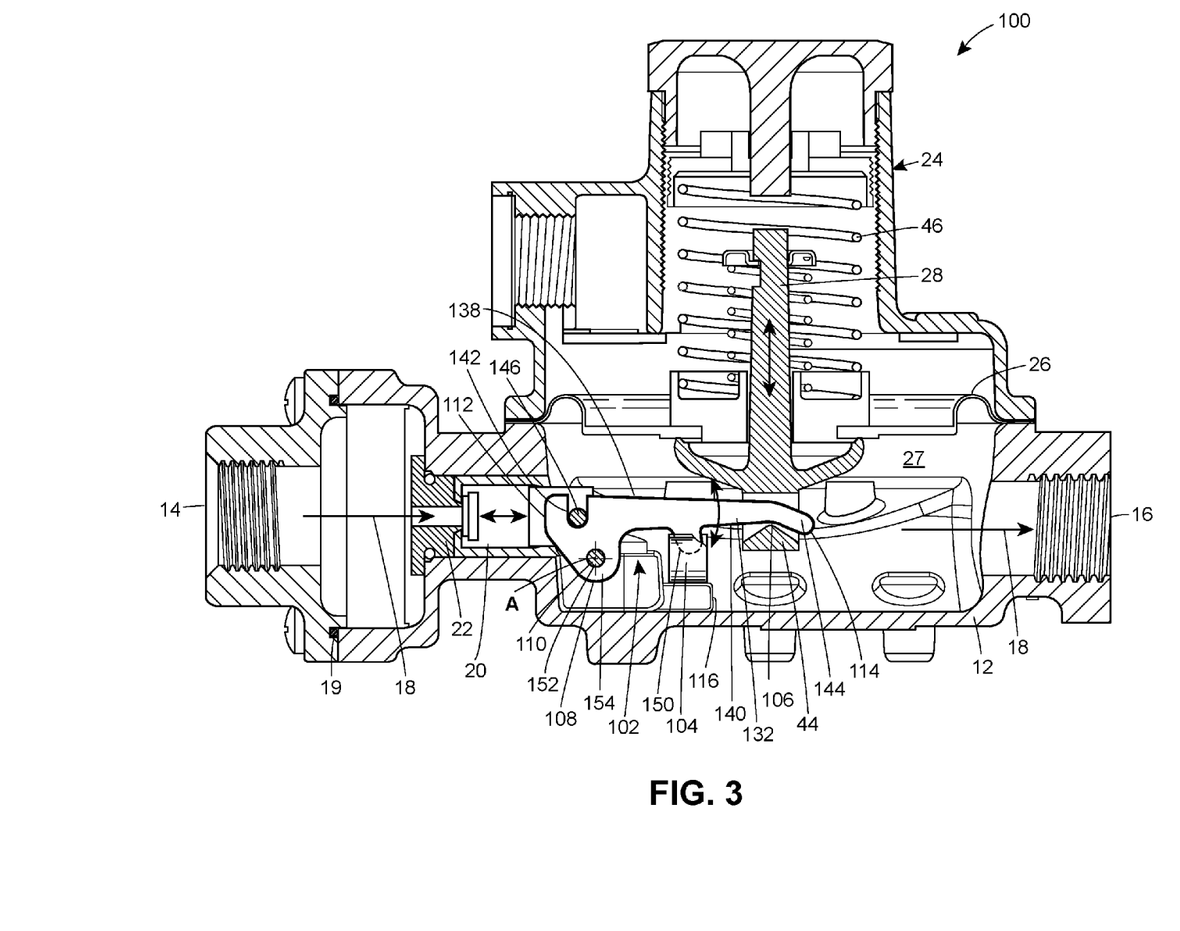
FIG. 3 is a cross-sectional view of a fluid regulator in a closed position including a lever assembly of the present disclosure.
Figure 4:
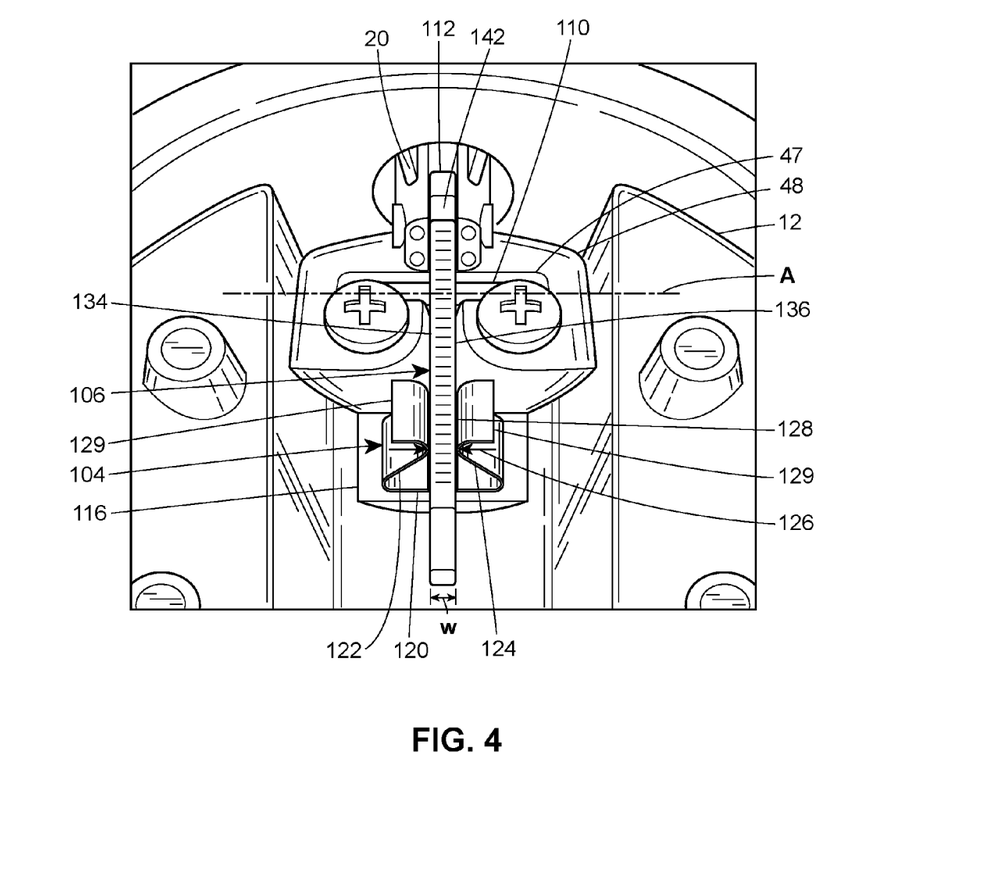
FIG. 4 is a top perspective view of the lever assembly of the fluid regulator of FIG. 3.
Figure 5:
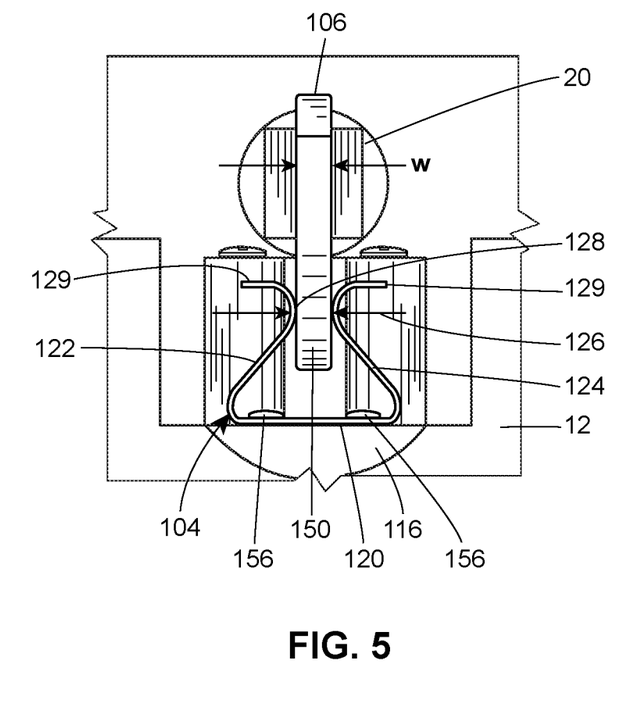
FIG. 5 is an end view of the lever assembly of the fluid regulator of FIG. 3.

Turning now to the exemplary arrangements of the drawings, FIGS. 3-5 illustrate a fluid regulator 100 including an exemplary lever assembly 102 with a damper 104 according to the teachings of the present disclosure. Except for the lever assembly 102 and the damper 104, the fluid regulator 100 is substantially similar to the regulator 10 of FIG. 1. Therefore, the same reference signs are used to refer to the same or substantially similar features of the fluid regulators, and reference is made to the previous description thereof without repeating such description except as necessary for understanding relative to the lever assembly 102 and the damper 104. It is understood that the lever assembly 102 and the damper 104 may be used with numerous different types and styles of fluid regulators, and the teachings of this disclosure are not to be limited to the exact exemplary fluid regulator 100 shown in the drawings, which is for purposes of explanation only.

The lever assembly 102 includes a lever 106 and the damper 104. The lever 106 includes a pivot 108 that is pivotably coupled to the regulator body 12 so as to pivot and/or rotate about an axis A that extends horizontally transverse to the fluid passageway 18. In this example, the pivot 108 includes a pin 110 that pivotably connects the lever 106 to the regulator body 12, but other pivot coupling mechanisms are also possible. A front end 112 of the lever 106 is coupled to the flow control member 20, and a back end 114 of the lever 106 is coupled to the actuator stem 28. Vertical motion of the actuator stem 28, which is caused by vertical movement of the diaphragm 26 in response to changes in the fluid pressure at the outlet 16, rotates the lever 106 about the axis A, which subsequently shifts the flow control member 20 horizontally backward and/or forward in the direction of the longitudinal axis of the fluid passageway 18, thereby shifting the flow control member 20 between an open position spaced apart from the valve seat 22 and a closed position, which may be engaging the valve seat 22 (as illustrated in FIG. 3).

The damper 104 is coupled to the regulator body 12, either directly or indirectly, for example, via a platform 116 intermediate the regulator body 12 and the damper 104. In either case, the damper 104 is fixed in a selected position relative to the regulator body 12. The damper 104 includes one or more resilient spring members 122, 124 that engage the lever 106. Preferably, the resilient spring members 122, 124 frictionally and slidingly squeeze the lever 106 in a direction parallel to the axis A, with an amount of force that is sufficient to reduce or even eliminate unwanted and/or uncontrolled pivoting and/or oscillation of the lever 106 about the axis A and that allows the lever 106 to pivot in response to desired control movements of the actuator 24 via the actuator stem 28 an amount necessary to maintain the desired outlet pressure. Thus, the damper 104 effectively dampens undesired pivoting movement of the lever 106, such as caused by uncontrolled oscillations, loose fittings, and/or valve flutter, which may thereby increase the effective life span and/or accuracy of the entire fluid regulator 100.

As best seen in FIGS. 4 and 5, the damper 104 is in the form of a clip spring having a base 120, a left resilient prong 122, and a right resilient prong 124, which form the resilient spring members. The left resilient prong 122 extends upwardly from a left edge of the base 120, and the right resilient prong 124 extends upwardly from the right edge of the base 120. The left resilient prong 122 and the right resilient prong 124 are spaced apart to form a gap 126 there between. The gap 126 is preferably slightly smaller than the corresponding width W of the portion of the lever 106 in the gap. Thus, the gap 126 receives a portion of the lever 106 such that the left resilient prong 122 and the right resilient prong 124 resiliently clip to the lever 106, for example, by squeezing against opposite sides of the lever 106. The size of the gap 126 may be selected so as to apply a preselected clamping, sliding, and/or frictional force against the lever 106 to reduce unwanted oscillation and movement of the lever without preventing the desired movement of the lever 106 in response to control movements of the actuator stem 28. Each of the left resilient prong 122 and the right resilient prong 124 slant inwardly from the base 120 up toward a clamping region 128, which defines the gap 126. At the clamping region 128, the resilient prongs 122, 124 then flare outwardly, such as with a curve or an angle, toward their distal ends 129, thereby forming a tapered receiver 130 that can guide the lever 106 into the gap 126, for example, during assembly of the fluid regulator 100. In this arrangement, the base 120, the left resilient prong 122, and the right resilient prong 124 are all formed of a single band of resilient metal, such as steel, which has been shaped, such as by known bending techniques, into the shape of the figures; however, the clip spring could be formed by any method sufficient to provide the desired clamping force against the lever 106. In addition, the various features of the clip spring may have other shapes as long as the left and right resilient prongs 122 and 124 are capable of clipping to the lever 106 to dampen unwanted oscillations of the lever 106. Furthermore, the damper 104 is not necessarily limited to having the form of a clip spring, but may take other forms with one or more resilient spring members that are similarly suitable for frictionally and/or resiliently engaging the lever 106 so as to dampen unwanted pivoting oscillations of the lever 106.

The lever 106 includes a lever arm 132 that extends from the front end 112 to the back end 114. The lever has a left side 134 and a right side 136, which extend from a top edge 138 to a bottom edge 140 and from the front end 112 to the back end 114. Preferably, the left side 134 and the right side 136 are parallel with each other such that the lever 106 has a constant width W throughout the entire lever 106. Preferably, the lever 106 is formed of a substantially planar (flat) piece of material. In this manner, the lever 106 can be relatively easily cut, for example, from a flat piece of metal bar stock; however, the lever 106 may take other shapes and need not have a flat, planar shape. A first coupling 142 is disposed at the front end 112 of the lever arm 136, and a second coupling 144 is disposed at the back end 114 of the lever arm 136. The first coupling 142 is in the form of a slot extending through the left and right sides 134, 136 and downwardly from the top edge 138 of the lever arm 132 adjacent the front end 112. The slot is sized to receive a bit 146, which is coupled to the flow control member 20, so that the bit 146 can slide and/or rotate within the slot when the lever 106 pivots about the axis A. The second coupling 144 is in the form of a hook or downwardly angled portion of the back end 114 of the lever arm 132, which fits over the saddle portion 44 of the actuator stem 28. However, the first and second couplings 142, 144 may take other forms as needed for coupling with a flow control member and an actuator.

The lever 106 also includes a lobe 150 to extend into the gap 126 of the damper 104. In this arrangement, the lobe 150 forms a bulge that extends downwardly from the bottom edge 140 of the lever arm 132 and is disposed spaced apart between the pivot 108 and the second coupling 144. However, the lobe 150 could take other shapes and/or forms arranged to be clipped within the gap 126 between the resilient spring members of the damper 104. As best seen in FIG. 3, the lobe 150 has a height that is sized to remain clipped between the prongs 122 and 124 of the clip spring through the entire range of motion of the lever 106 between the open position and the closed position of the flow control member 20. Thus, the lobe 150 allows the damper 104 to maintain engagement with the lever 106 at all times, thereby enabling the damper 104 to dampen movement of the lever 106 throughout the entire range of motion of the lever 106. Preferably, the lobe 150 has parallel left and right sides engaged by the respective left and right resilient prongs 122, 124 so that the clamping force of the damper 104 against the lever 106 remains constant throughout the range of motion of the lever 106. However, the surfaces of the lobe 150 could be shaped differently so that the clamping force of the damper 104 varies relative to different positions along the range of motion of the lever 106, for example, by having tapered or curved sides rather than parallel sides. In some arrangements, the lever arm 132 may not be formed of a flat piece of material with a constant width W as described above, in which case, the lobe 150 may be the only portion of the lever 106 that is disposed in the gap 126 between the prongs 122 and 124 through the entire range of motion of the lever 106. This way, levers of different shapes can be modified to include a lobe 150 to engage the damper 104 and to provide a constant squeezing and/or clamping force to dampen the lever without changing the basic shape and/or structure of the remaining portions of the lever. In addition, although the lobe 150 is shown on the bottom edge 140 of the lever arm 132, in other arrangements, the lobe 150 could be disposed in other locations along the lever 106, such as along the top edge 138, between the top and bottom edges 138, 140, and/or at either the front end 112 or the back end 114, depending upon the location of the damper 104 in the regulator body 12 and/or a desired mechanical lever advantage.

The pivot 108 includes the pin 110 that extends through an aperture 152 through an offset portion 154 of the lever arm 132 along the bottom edge 140 near the front end 112. In particular, the offset portion 154 is offset downwardly from the lever arm 132 such that the aperture 152 is offset downwardly and rearwardly from the first coupling 142 so that the vertical motion of the back end 114 is converted to the horizontal motion at the front end 112. The pin 110 preferably has a very tight friction fit or is otherwise fixedly fit within the aperture 152, for example by welding or other fixed coupling means, in order to prevent the lever arm 132 from moving separately relative to the pin 110 in either a rotational or a lateral movement. In some arrangements, the pin 110 may be formed integrally, such as by casting or machining, with the lever arm 132, in which case, the aperture 152 may be omitted as unnecessary. However, the pivot 108 is not necessarily limited to the specific arrangements, and could take other arrangements capable of pivotably coupling the lever 106 with the regulator body 12. In the present example, the offset portion 154 is spaced apart from the lobe 150, and the lobe 150 is spaced apart from the second coupling 144, such that the lobe 150 is disposed between and spaced from the pivot 108 and the back end 114. However, the exact shape and outline of the top and bottom edges 138, 140 may be modified as necessary to fit a specific arrangement of a flow control member 20, a regulator body 12, and an actuator stem 28, so long as the damper 104 is able to slidably and clamping the engage a portion of the lever 106 so as to dampen unwanted oscillations, as explained previously.

The damper 104 may be fixedly coupled with the regulator body 12 by any suitable mechanism. In the example of the drawings, the damper 104 in the form of a clip spring is coupled to the platform 116 by one or more fasteners 156, such as screws or rivets. However, the damper 104 could be coupled to the regulator body with other mechanisms, such as by welding, adhesive, or forming as an integral part of the regulator body 12.

A lever assembly as described herein, for example, including the lever 106 and the damper 104, may help extend the useful life and/or improve the accuracy of the fluid regulator 100. In addition, a lever with the lobe 150 may allow different shapes and sizes of levers to be easily adapted for use with the damper 104 without having to substantially reconfigure the shape of the lever. Additional technical effects and/or benefits may also be realized by a lever assembly with a damper as disclosed herein.

This detailed description is to be construed as examples only and does not describe every possible embodiment, as describing every possible embodiment would be impractical, if not impossible. One could implement numerous alternate embodiments, using either current technology or technology developed after the filing date of this application. Thus, while specific exemplary forms are illustrated and described herein, it is to be understood that any of the various aspects, arrangements, and/or features disclosed herein may be combined with any one or more of the other aspects, arrangements, and/or features disclosed herein in a manner that would be understood by a person of ordinary skill in view of the teachings of this disclosure.

We claim:

1. A lever assembly for a fluid regulator, comprising:
    a lever to be pivotably coupled to a regulator body, wherein the lever rotates about a first axis to shift a flow control member between an open position and a closed position in the regulator body, wherein the lever comprises: a lever arm extending from a first end to a second end, wherein a first coupling to be operatively coupled to the flow control member is disposed at the first end, and a second coupling to be operatively coupled to an actuator is disposed at the second end; a pivot extending along the first axis; and a lobe projecting outwardly from the lever arm; and
    a damper configured to be coupled to the regulator body;
    wherein the damper comprises a clip spring that squeezes the lobe of the lever parallel to the first axis without preventing the lever from pivoting in response to control movements of an actuator adapted to actuate the lever.

2. The lever assembly of claim 1, wherein the clip spring comprises:
    a base;
    a first resilient prong extending upwardly from the base; and
    a second resilient prong extending upwardly from the base;
    wherein at least a portion of the lever is disposed between the first resilient prong and the second resilient prong; and
    wherein the first and second resilient prongs squeeze against opposite sides of the at least a portion of the lever.

3. The lever assembly of claim 1, wherein the lobe has first and second sides to be squeezed by the damper, and the first side is parallel to the second side.

4. The lever assembly of claim 1, wherein the lobe projects from the lever arm toward the clip spring.

5. The lever assembly of claim 1, wherein the lever arm, the pivot, and the lobe are disposed in a single plane that is transverse to the first axis.

6. The lever assembly of claim 1, wherein the lobe projects outwardly from the lever at a position between the first and second ends of the lever arm.

7. A lever for a lever assembly of a fluid regulator, comprising:
- a lever arm having a first side and a second side extending between a top edge, a bottom edge, a first end, and a second end,
- a first coupling disposed at the first end of the lever arm to be operatively coupled to a flow control member of the fluid regulator,
- a second coupling disposed at the second end of the lever arm to be operatively coupled to an actuator for the fluid regulator;
- a pivot disposed along the lever arm to be pivotably coupled with a regulator body; and
- a lobe projecting downwardly from the bottom edge of the lever arm to engage a damper,
- wherein the lobe is disposed between the pivot and the second coupling.

8. The lever of claim 7, wherein the lobe has first and second sides to be squeezed by the damper, and the first side is parallel to the second side.

9. The lever of claim 7, wherein the lever arm, the lobe, and the pivot are disposed in a single plane.

10. The lever of claim 7, wherein the pivot and the lobe are disposed along the bottom edge of the lever arm.

11. A lever for a lever assembly of a fluid regulator, comprising:
- a lever arm having a first side and a second side extending between a top edge, a bottom edge, a first end, and a second end,
- a first coupling disposed at the first end of the lever arm to be operatively coupled to a flow control member of the fluid regulator,
- a second coupling disposed at the second end of the lever arm to be operatively coupled to an actuator for the fluid regulator;
- a pivot disposed along the lever arm to be pivotably coupled with a regulator body; and
- a lobe projecting downwardly from the bottom edge of the lever arm to engage a damper,
- wherein the first coupling comprises an elongate cutout in the top edge to receive a bit connected to the flow control member, the cutout sized to allow the bit to slide along the elongate cutout, the pivot comprises an aperture through an offset portion projecting downwardly from the bottom edge, the aperture sized to receive a pin, and the second coupling comprising an angled portion of the lever arm to hook to an actuator stem.

12. The lever of claim 11, wherein the lobe is disposed between the pivot and the second coupling.

13. The lever of claim 11, wherein the lobe has first and second sides to be squeezed by the damper, and the first side is parallel to the second side.

14. The lever of claim 11, wherein the lever arm, the lobe, and the pivot are disposed in a single plane.

15. The lever of claim 11, wherein the pivot and the lobe are disposed along the bottom edge of the lever arm.

16. A fluid regulator, comprising:
- a regulator body defining a flow path extending from an inlet to an outlet;
- a flow control member disposed in the regulator body and shiftable between an open position and a closed position to control the flow of fluid through the flow path;
- a lever pivotably coupled to the regulator body, wherein the lever rotates about a first axis to shift the flow control member between the open position and the closed position;
- an actuator coupled to the lever, wherein the actuator rotates the lever about the first axis in response to fluid pressure in the regulator body; and
- a damper coupled to the regulator body, wherein the damper squeezes the lever parallel to the first axis without preventing the lever from pivoting in response to control movements of the actuator,
- wherein the damper comprises a clip spring comprising:
  - a base coupled to the regulator body;
  - a first resilient prong extending upwardly from the base; and
  - a second resilient prong extending upwardly from the base;
- wherein at least a portion of the lever is disposed between the first resilient prong and the second resilient prong; and
- wherein the first and second resilient prongs squeeze against opposite sides of the portion of the lever, and
- wherein the lever further comprises:
  - a lever arm extending from a first end to a second end, wherein the first end forms a first coupling operatively coupled to the flow control member, and the second end forms a second coupling operatively coupled to the actuator;
  - a pivot extending along the first axis;
  - a pin extending through the pivot, wherein the lever is pivotably coupled to the regulator body by the pin; and
  - a lobe projecting outwardly from the lever arm,
- wherein the clip spring squeezes the lobe.

17. The fluid regulator of claim 16, wherein the lobe has parallel opposite sides that are squeezed by the clip spring.

18. The fluid regulator of claim 16, wherein the lobe projects from the lever arm toward the clip spring.

19. The fluid regulator of claim 16, wherein the lever arm, the pivot, and the lobe are disposed in a single plane that is transverse to the first axis.

* * * * *